United States Patent [19]

Bergen

[11] Patent Number: 5,075,703

[45] Date of Patent: Dec. 24, 1991

[54] RIBBON CORONODE

[75] Inventor: Richard F. Bergen, Ontario, N.Y.

[73] Assignee: Xerox Corporation, Stamford, Conn.

[21] Appl. No.: 544,563

[22] Filed: Jun. 27, 1990

[51] Int. Cl.[5] ....................... G01D 15/06; H01J 19/04; G03G 15/02

[52] U.S. Cl. .................................... 346/159; 250/325; 355/221

[58] Field of Search ................ 346/159; 250/324-326; 355/221

[56] References Cited

U.S. PATENT DOCUMENTS

| | | | |
|---|---|---|---|
| 2,836,725 | 5/1958 | Vyverberg | 250/49.5 |
| 2,879,395 | 3/1959 | Walkup | 250/49.5 |
| 3,717,801 | 2/1973 | Silverberg | 317/262 |
| 3,959,690 | 5/1976 | Leibrecht | 317/4 |
| 4,349,359 | 9/1982 | Fitch et al. | 55/151 |
| 4,414,603 | 11/1983 | Masuda | 361/227 |
| 4,538,163 | 8/1985 | Sheridon | 346/159 X |
| 4,626,876 | 12/1986 | Miyagawa et al. | 346/160 |

*Primary Examiner*—George H. Miller, Jr.
*Attorney, Agent, or Firm*—William A. Henry, II

[57] ABSTRACT

A charging device includes a thin (1 mil) conductive strip edge-on used as a coronode.

2 Claims, 2 Drawing Sheets

RIBBON CORONODE

FIELD OF THE INVENTION

The present invention relates to a charging device for depositing charge on an adjacent surface. More particularly, it is directed to a ribbon coronode for use in such a device. The device is usable in a xerographic reproduction system for generating a flow of ions onto an adjacent imaging surface for altering or changing the electrostatic charge thereon.

BACKGROUND OF THE INVENTION

In the electrophotographic reproducing arts, it is necessary to deposit a uniform electrostatic charge on an imaging surface, which charge is subsequently selectively dissipated by exposure to an information containing optical image to form an electrostatic latent image. The electrostatic latent image may then be developed and the developed image transferred to a support surface to form a final copy of the original document.

In addition to precharging the imaging surface of a xerographic system prior to exposure, corona devices are used to perform a variety of other functions in the xerographic process. For example, corona devices aid in the transfer of an electrostatic toner image from a reusable photoreceptor to a transfer member, the tacking and detacking of paper to the imaging member, the conditioning of the imaging surface prior to, during, and after the deposition of toner thereon to improve the quality of the xerographic copy produced thereby.

Both D.C. and A.C. type corona devices are used to perform many of the above functions.

The conventional form of corona discharge device for use in reproduction systems of the above type is shown generally in U.S. Pat. No. 2,836,725 in which a conductive corona electrode in the form of an elongated wire is connected to a corona generating D.C. voltage. The wire is partially surrounded by a conductive shield which is usually electrically grounded. The surface to be charged is spaced from the wire on the side opposite the shield and is mounted on a grounded substrate. Alternately, a corona device of the above type may be biased in a manner taught in U.S. Pat. No. 2,879,395 wherein an A.C. corona generating potential is applied to the conductive wire electrode and a D.C. potential is applied to the conductive shield partially surrounding the electrode to regulate the flow of ions from the electrode to the surface to be charged. Other biasing arrangements are known in the prior art and will not be discussed in great detail herein.

One of the problems with these devices is that they have a propensity for vibration, singing and sagging, especially when they are used for charging over a wide area and it is difficult to use them placed closed to the surface to be charged.

Various approaches to answering these problems have been tried in the past. For example, U.S. Pat. No. 3,717,801 discloses a corona charging system wherein a plurality of ion discharging coronodes, made from thin conductive strips, which charge the surface of a receiving medium within a document reproduction machine. U.S. Pat. No. 3,959,690 is directed to a corona charging element for an electrophotographic reproduction machine that includes a coronode member in the form of a metal strip with peaks on one side thereof alternately positioned in the plane of one side of the strip and then the other with the peaks having the shape of a four sided pyramid and one side of the pyramid lying in the plane of the surface of the strip which charges a conductive photoreceptor surface by discharging an ion charging current directly onto the photoreceptor surface. An electrostatic precipitator apparatus is disclosed in U.S. Pat. No. 4,349,359 that includes an ion generating electrode in the form of a long twisted strip that charges the surface of collecting plates. U.S. Pat. No. 4,626,876 discloses a solid state corona discharger that includes a pair of parallel strip-shaped A.C. electrodes that discharge an ion charging current onto the surface of a photosensitive member. A particle charging apparatus is shown in U.S. Pat. No. 4,414,603 that includes a group of parallel, narrow strip-shaped corona electrodes which collectively discharge an electric field to within a designated charging space when activated by an A.C. source voltage. Although these attempts at solving the above-mentioned charging problem have had some success, they have not been entirely satisfactory.

SUMMARY OF THE INVENTION

Accordingly, a charging device is disclosed that employs a ribbon coronode which discharges an ion charging current onto a photoreceptor surface. The ribbon coronode is configured to be edge on and is about 1 mil thick. This configuration has reduced the propensity for vibration and sagging compared to wires. Also, corona is initiated at the edge of the strip at lower voltage than for wires. In addition, this configuration enables locating the coronode very close to the charging surface with operation in a self-limiting mode and at lower voltages than with wires. The ribbon coronode also affords efficient operation over extremely wide charging distances.

BRIEF DESCRIPTION OF THE DRAWINGS

The foregoing and other features of the instant invention will be more apparent from a further reading of the specification, claims and from the drawings in which:

DETAILED DESCRIPTION OF THE DRAWINGS

Figure 1:
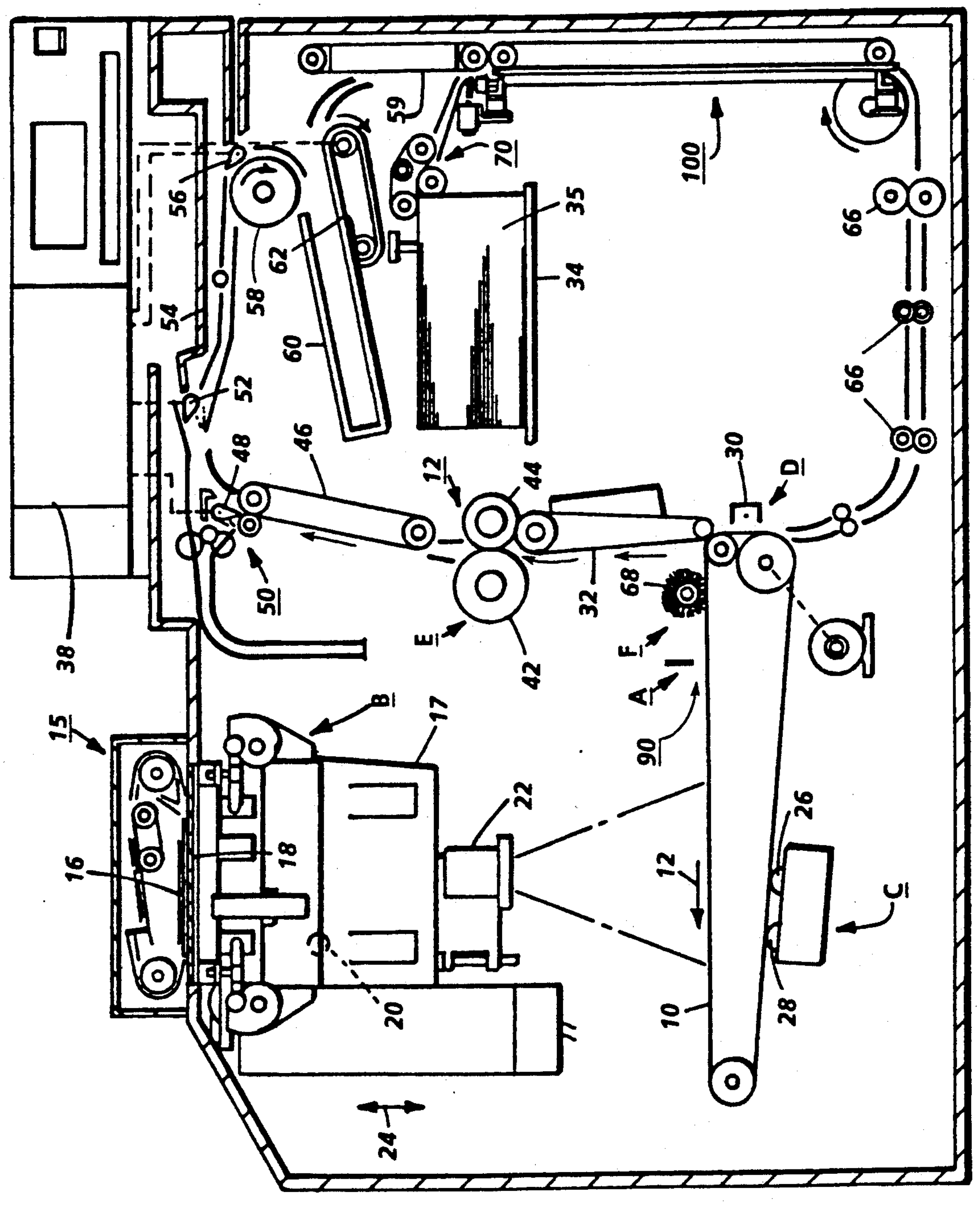
FIG. 1 is a schematic elevational view showing an electrophotographic copier employing the features of an aspect of the present invention.

For a general understanding of the features of the present invention, reference is had to the drawings. In the drawings, like reference numerals have been used throughout to designate identical elements. FIG. 1 schematically depicts the various components of an illustrative electrophotographic copying machine incorporating the improved charging apparatus of the present invention therein.

Inasmuch as the art of electrophotographic copying is well known, the various processing stations employed in the FIG. 1 copying machine will be shown hereinafter schematically and their operation described briefly with reference thereto.

As shown in FIG. 1, the illustrative electrophotographic printing machine employs a belt 10 having a photoconductive surface thereon. Preferably, the photoconductive surface is made from a selenium alloy. Belt 10 moves in the direction of arrow 12 to advance successive portions of the photoconductive surface through the various processing stations disposed about the path of movement thereof.

Initially, a portion of the photoconductive surface passes through charging station A. At charging station A, a corona generating device in accordance with the present invention, indicated generally by the reference numeral 90, charges the photoconductive surface to a relatively high substantially uniform potential.

Next, the charged portion of the photoconductive surface is advanced through imaging station B. At imaging station B, a document handling unit indicated generally by the reference numeral 15, positions original document 16 facedown over exposure system 17. The exposure system, indicated generally by reference numeral 17 includes lamp 20 which illuminates document 16 positioned on transparent platen 18. The light rays reflected from document 16 are transmitted through lens 22. Lens 22 focuses the light image of original document 16 onto the charged portion of the photoconductive surface of belt 10 to selectively dissipate the charge thereof. This records an electrostatic latent image on the photoconductive surface which corresponds to the information areas contained within the original document. Thereafter, belt 10 advances the electrostatic latent image recorded on the photoconductive surface to development station C. Platen 18 is mounted movably and arranged to move in the direction of arrows 24 to adjust the magnification of the original document being reproduced. Lens 22 moves in synchronism therewith so as to focus the light image of original document 16 onto the charged portions of the photoconductive surface of belt 10.

Document handling unit 15 sequentially feeds documents from a stack of documents placed by the operator in a normal forward collated order in a document stacking and holding tray. The documents are fed from the holding tray in seriatim, to platen 18. The document handling unit recirculates documents back to the stack supported on the tray. Preferably, the document handling unit is adapted to serially sequentially feed the documents, which may be of various sizes and weights of paper or plastic containing information to be copied. The size of the original document disposed in the holding tray and the size of the copy sheet are measured.

While a document handling unit has been described, one skilled in the art will appreciate that the size of the original document may be measured at the platen rather than in the document handling unit. This is required for a copying or printing machine which does not include a document handling unit, or when one is making copies of A3 or 11"×17" documents where the document handler has to be raised up from the platen and the oversized document manually placed on the platen for copying.

With continued reference to FIG. 1, at development station C, a pair of magnetic brush developer rollers, indicated generally by the reference numerals 26 and 28, advance a developer material into contact with the electrostatic latent image. The latent image attracts toner particles from the carrier granules of the developer material to form a toner powder image on the photoconductive surface of belt 10.

After the electrostatic latent image recorded on the photoconductive surface of belt 10 is developed, belt 10 advances the toner powder image to transfer station D. At transfer station D, a copy sheet is moved into contact with the toner powder image. Transfer station D includes a corona generating device 30 which sprays ions onto the backside of the copy sheet. This attracts the toner powder image from the photoconductive surface of belt 10 to the sheet. After transfer, conveyor 32 advances the sheet to fusing station E.

The copy sheets are fed from tray 34 to transfer station D. The tray senses the size of the copy sheets and sends an electrical signal indicative thereof to a microprocessor within controller 38. Similarly, the holding tray of document handling unit 15 includes switches thereon which detect the size of the original document and generate an electrical signal indicative thereof which is transmitted also to a microprocessor controller 38.

Fusing station E includes a fuser assembly, indicated generally by the reference numeral 40, which permanently affixes the transferred powder image to the copy sheet. Preferably, fuser assembly 40 includes a heated fuser roller 42 and backup roller 44. The sheet passes between fuser roller 42 and backup roller 44 with the powder image contacting fuser roller 42. In this manner, the powder image is permanently affixed to the sheet.

After fusing, conveyor 46 transports the sheets to gate 48 which functions as an inverter selector. Depending upon the position of gate 48, the copy sheets will either be deflected into a sheet inverter 50 or bypass sheet inverter 50 and be fed directly onto a second decision gate 52. Thus, copy sheets which bypass inverter 50 turn a 90° corner in the sheet path before reaching gate 52. Gate 48 directs the sheets into a face up orientation so that the imaged side which has been transferred and fused is face up. If inverter path 50 is selected, the opposite is true, i.e., the last printed face is facedown. Second decision gate 52 deflects the sheet directly into an output tray 54 or deflects the sheet into a transport path which carries it on without inversion to a third decision gate 56. Gate 56 either passes the sheets directly on without inversion into the output path of the copier, or deflects the sheets into a duplex inverter roll transport 58. Inverting transport 58 inverts and stacks the sheets to be duplexed in a duplex tray 60 when gate 56 so directs. Duplex tray 60 provides intermediate or buffer storage for those sheets which have been printed on one side and on which an image will be subsequently printed on the side opposed thereto, i.e., the copy sheets being duplexed. Due to the sheet inverting by rollers 58, these buffer set sheets are stacked in duplex tray 60 facedown. They are stacked in duplex tray 60 on top of one another in the order in which they are copied.

In order to complete duplex copying, the previously simplexed sheets in tray 60 are fed to conveyor 59 seriatim by bottom feeder 62 back to transfer station D for transfer of the toner powder image to the opposed side of the sheet. Conveyors 100 and 66 advance the sheet along a path which produces an inversion thereof. However, inasmuch as the bottommost sheet is fed from duplex tray 60, the proper or clean side of the copy sheet is positioned in contact with belt 10 at transfer station D so that the toner powder image thereon is transferred thereto. The duplex sheets are then fed through the same path as the previously simplexed sheets to be stacked in tray 54 for subsequent removal by the printing machine operator.

Returning now to the operation of the printing machine, invariably after the copy sheet is separated from the photoconductive surface of belt 10, some residual particles remain adhering to belt 10. These residual particles are removed from the photoconductive surface thereof at cleaning station F. Cleaning station F includes a rotatably mounted fibrous brush 68 in contact with photoconductive surface of belt 10. These particles are cleaned from the photoconductive surface of belt 10 by the rotation of brush 68 in contact therewith. Subsequent to cleaning, a discharge lamp (not shown) floods the photoconductive surface with light to dissipate any residual electrostatic charge remaining thereon prior to the charging thereof for the next successive imaging cycle.

Figure 2:
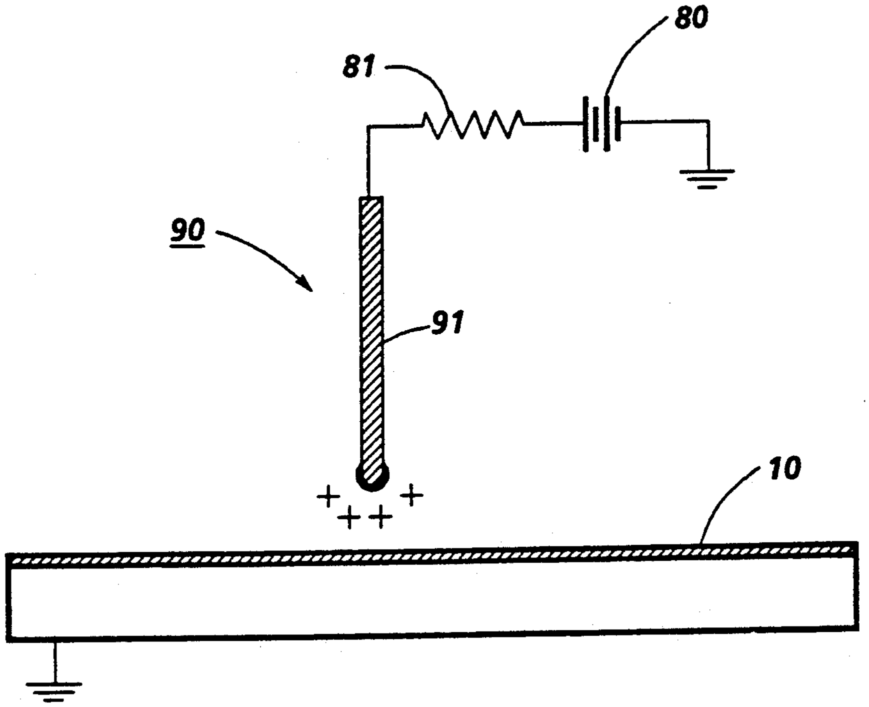
FIG. 2 shows a side view of the charging device of FIG. 1 and the present invention employed as the charging unit.

Turning now to an aspect of the present invention, and in reference to FIG. 2, corotron 90 is positioned in a vertical plane with respect to the photoreceptor 10 and comprises a coronode in the form of a grounded thin (about 1 mil thick) conductive ribbon 91. Tests have shown that with a 1 mil thick steel shim stock material, 4 mm wide and 100 mm in length configured with a wedge gap of between 0.75 and 1.0 mm away from a bareplate, a uniform corona results without hot spots graded in light intensity along the gap for a positive coronode potential. The device is configured to include high impedance 81 to the coronode with minimum capacitance coupling. A shield could be added if desired for corotron applications or a screen could be added for scorotron use without detracting from the use of ribbon coronode 91. The ground edge of the shim stock and thin dimension offer considerable benefit for ease in producing corona. Only 3.9 kV was needed from high voltage source 80 in order to obtain a bright corona. In a long charging unit, the ribbon will suppress motion in both the X and Y directions, thereby decreasing the propensity for vibration and sagging found to be prevalent with wire corotrons.

Corotron 90 gives excellent results for positive charging with ribbon coronode 91 positioned on its edge which is in contrast to U.S. Pat. No. 3,717,801 where both edges of a strip mounted on an insulating substrate is used for corona generation. It is not very efficient to use both edges of a strip since corona is at each edge. If a strip is in contact with another material, the voltage gradient around the edges are much different in the presence of air than in the presence of that material and those gradients determine threshhold breakdown, levels and even the onset to breakdown and the uniformity of breakdown is more than likely to not be uniform. Also, since the '801 patent uses a strip in contact with another material, it cannot be used in A.C. charging with a D.C. bias. All of the aforementioned difficulties are not present with an on edge configured ribbon coronode 91. It should be understood that the charging device in U.S. Pat. No. 3,959,690 is not suitable for positive charging since it charges with tips as opposed to a smooth ribbon 91. The smaller the radius on ribbon 91 the greater the corona and the lower voltage has to be for breakdown which means lower cost for the device. The spacing with a needle type electrode is great as is the distance from the photoreceptor, therefore, the uniformity of charge is not as good as with a thin ribbon such a ribbon 91. Also, the tips of needles become dirty after some use causing their corona output to be variable. In contrast, ribbon 91 is gives uniform emission of ions since there is no spacing between needle points.

It should now be apparent that a novel charging device is disclosed in which the coronode comprises a thin conductive strip that is configured edge on. This configuration is significant in that vibration and sagging is reduced as opposed to using wires as coronodes. The edge on coronode gives a uniform corona for positive charging.

While this invention has been described with reference to the structures disclosed herein, they are not confined to the details as set forth and are intended to cover modifications and changes that may come within the scope of the following claims.

What is claimed is:

1. A D.C. charging device adapted to apply a uniform charge to a charge retentive surface, comprising:

a corona producing means in the form of a thin conductive strip configured edge on so as to present a small radius to the surface to be charged; and high voltage means connected to said corona producing means and adapted to apply sufficient voltage to said corona producing means that corona ions are emitted from said corona producing means toward a surface to be charged.

2. A D.C. charging device adapted to apply a uniform charge to a charge retentive surface, comprising:

a corona producing means in the form of a grounded, thin conductive strip configured in a vertical plane edge on so as to present a small radius to the charge retentive surface, said conductive strip having a uniform thickness throughout its height in the vertical plane of about 1 mil and positioned between 0.75 and 1.0 mm away from the charge retentive surface; and high voltage means connected to said corona producing means and adapted to apply sufficient voltage to said corona producing means that corona ions are emitted from said corona producing means toward the charge retentive surface.

* * * * *